United States Patent
Nishioka

(10) Patent No.: US 9,841,848 B2
(45) Date of Patent: Dec. 12, 2017

(54) INPUT DEVICE

(71) Applicant: Funai Electric Co., Ltd., Daito, Osaka (JP)

(72) Inventor: Ken Nishioka, Kawachinagano (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 25 days.

(21) Appl. No.: 14/739,189

(22) Filed: Jun. 15, 2015

(65) Prior Publication Data

US 2015/0370416 A1    Dec. 24, 2015

(30) Foreign Application Priority Data

Jun. 20, 2014   (JP) ................................ 2014-126966

(51) Int. Cl.
G06F 3/042       (2006.01)
G06F 3/01        (2006.01)
G06F 3/041       (2006.01)

(52) U.S. Cl.
CPC ............ *G06F 3/0428* (2013.01); *G06F 3/017* (2013.01); *G06F 3/0416* (2013.01); *G06F 3/0423* (2013.01); *G06F 2203/04108* (2013.01)

(58) Field of Classification Search
CPC .................. G06F 3/017; G06F 3/0416; G06F 2203/04108; G06F 3/0423; G06F 3/0428
See application file for complete search history.

(56) References Cited

U.S. PATENT DOCUMENTS

| | | | |
|---|---|---|---|
| 6,650,318 B1 | 11/2003 | Arnon | |
| 8,243,287 B2 * | 8/2012 | Nishigaki | G03B 21/132 356/614 |
| 2004/0125147 A1 | 7/2004 | Liu et al. | |
| 2013/0162598 A1* | 6/2013 | Lin | H04N 9/3129 345/175 |
| 2016/0156892 A1* | 6/2016 | Sumiyoshi | G03B 21/14 348/502 |

FOREIGN PATENT DOCUMENTS

EP    2574058 A2    3/2013
JP    2011-129012 A    6/2011

OTHER PUBLICATIONS

Extended European Search Report of the corresponding European Application No. 15172792.2, dated Oct. 16, 2015.

* cited by examiner

*Primary Examiner* — Nelson Rosario
(74) *Attorney, Agent, or Firm* — Global IP Counselors, LLP

(57) ABSTRACT

An input device includes an irradiation component that emits scanning light relative to an input region of a projected image, a light receiver that receives reflected light of the scanning light to output detection signal, a detector that detects an input operation relative to the input region based on the detection signal from the light receiver; and a controller that sets an irradiation parameter of the scanning light from the irradiation component based on the input region.

19 Claims, 8 Drawing Sheets

INPUT DEVICE

CROSS-REFERENCE TO RELATED APPLICATIONS

This application claims priority to Japanese Patent Application No. 2014-126966 filed on Jun. 20, 2014. The entire disclosure of Japanese Patent Application No. 2014-126966 is hereby incorporated herein by reference.

BACKGROUND

Field of the Invention

The present invention generally relates to an input device.

Background Information

Input devices have been proposed in which an infrared beam or other such light source is used to detect an indicator such as a finger, a pointer, or the like that has been moved toward an input screen to accept an input operation. An input device such as this is disclosed in Japanese Laid-Open Patent Application Publication No. 2011-129012 (Patent Literature 1), for example.

With the input device discussed in Patent Literature 1, the display screen is divided into a video region and an input region. Input operations with a finger or other such indicator are performed by sending and receiving the infrared light to and from the input region in a lattice pattern. The input device has a light emitting part having a plurality of light sources that are arranged at a specific spacing, and a light receiving part having a plurality of opto-electrical conversion elements that are arranged at a specific spacing and correspond to the light sources in the input region. With this input device, part of the display screen is reserved for the input region, and this lowers the cost and reduces power consumption.

SUMMARY

However, with the input device discussed above, the light emitting part and the light receiving part have to be disposed around the edges of the display screen in order for the light to irradiate the input region, which is a part of the display screen. Consequently, the light also irradiates regions other than the input region, which can lead to wasted power consumption and to a shorter service life of the light sources. There is also the risk that mis-detection will occur when the light irradiates regions other than the input region.

Furthermore, since the input region is fixed in the above-mentioned input device, the input operations can only be performed at certain positions due to the structure. Therefore, the position of the input region cannot be changed to match the video being displayed on the display screen, which is not user-friendly.

One aspect is to provide an input device with which power consumption can be reduced and the service life of light sources can be increased, and which is easier to operate.

In view of the state of the known technology, an input device is provided that includes an irradiation component that emits scanning light relative to an input region of a projected image, a light receiver that receives reflected light of the scanning light to output detection signal, a detector that detects an input operation relative to the input region based on the detection signal from the light receiver; and a controller that sets an irradiation parameter of the scanning light from the irradiation component based on the input region.

Also other objects, features, aspects and advantages of the present disclosure will become apparent to those skilled in the art from the following detailed description, which, taken in conjunction with the annexed drawings, discloses one embodiment of the input device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
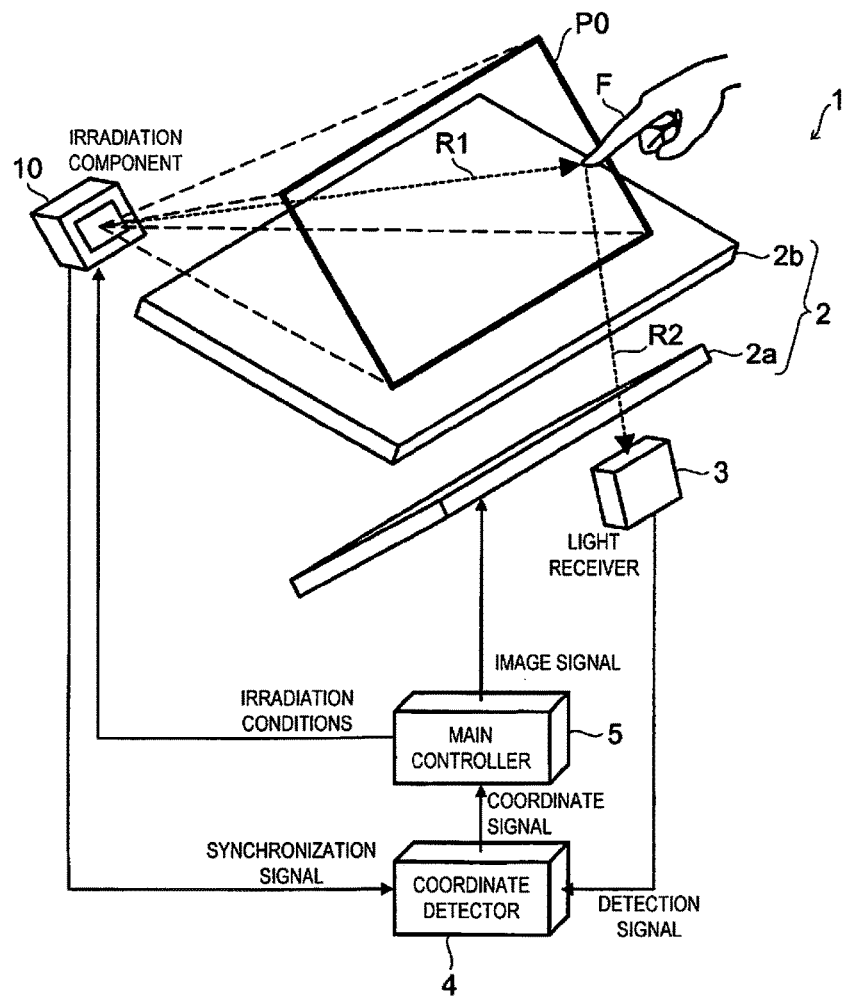
FIG. 1 is a simplified diagram of the configuration of an input device in accordance with a first embodiment.
Figure 2:
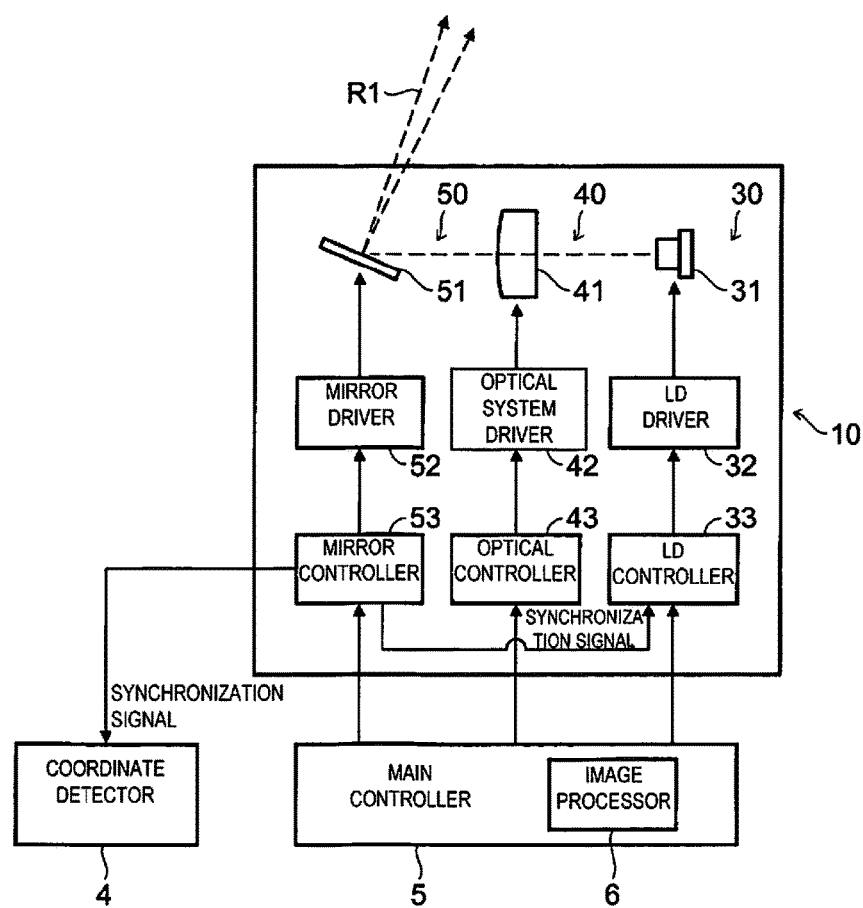
FIG. 2 is a block diagram of the configuration of an irradiation component, a coordinate detector, and a main controller of the input device in accordance with the first embodiment.

Referring initially to FIGS. 1 and 2, an input device 1 is illustrated in accordance with a first embodiment. FIG. 1 is a simplified diagram of the configuration of the input device 1, and FIG. 2 is a block diagram of the configuration of an irradiation component 10, a coordinate detector 4, and a main controller 5 of the input device 1.

As shown in FIG. 1, the input device 1 comprises a projection component 2, the irradiation component 10, a light receiver 3, the coordinate detector 4, and the main controller 5. The input device 1 is a three-dimensional type of input device, and projects a midair image P0 (e.g., a projected image) that includes an input region into a specific region in the air. The input device 1 also accepts input operations by detecting a finger F or other such indicator that is pointed at this input region.

The projection component 2 comprises an image display component 2a and a midair projection panel 2b. The image display component 2*a* displays an image that serves as the basis for the midair image P0 including the input region displayed in the air, according to the application that accepts the input operation. The image that serves as the basis for the midair image P0 is produced by an image processor 6 (discussed below). The midair projection panel 2*b* produces the midair image P0 by projecting the image displayed by the image display component 2*a* toward a specific region in the air.

The irradiation component 10 comprises a light emitting component 30, an optical component 40, and a scanner 50. The light emitting component 30 comprises an infrared laser diode (hereinafter referred to as infrared LD) 31, an LD driver 32, and an LD controller 33. The optical component 40 comprises an optical system 41, an optical system driver 42, and an optical system controller 43. The scanner 50 comprises a scanning mirror 51, a mirror driver 52, and a mirror controller 53.

The infrared LD 31 is a light emitting element that emits an infrared laser beam. The LD driver 32 can control drive related to output, on/off switching, and so forth of the light emitted by the infrared LD 31. The LD controller 33 produces a light control signal for the infrared LD 31 according to the irradiation position set to correspond to the midair image P0 and a synchronization signal received from the mirror controller 53, for example, and outputs this light control signal to the LD driver 32.

The optical system 41 includes, for example, a collimating lens and other such optical members. The optical system driver 42 moves the collimating lens, for example, in the optical axis direction to adjust the spot size and so forth of the infrared laser beam that reaches the midair image P0. The optical controller 43 produces a drive control signal for controlling the operation of the optical system 41, and outputs this to the optical system driver 42.

The scanning mirror 51 can change the reflection direction of the infrared laser beam biaxially. When the scanning mirror 51 changes the reflection direction of the infrared laser beam, a scanning laser beam R1 is emitted from the irradiation component 10 toward the midair image P0.

The mirror driver 52 is a drive controller that controls the scanning mirror 51. The mirror driver 52 drives the scanning mirror 51 according to horizontal synchronization signals and vertical synchronization signals from the mirror controller 53, and deflects the reflection direction of the laser beam produced by the scanning mirror 51 to the horizontal and vertical directions.

The "horizontal direction" used below in discussing the optical scanning and the midair image P0 means the left and right lateral direction of the midair image P0 as drawn in FIGS. 4 to 6, and the "vertical direction" means the up and down direction of the midair image P0 as drawn in FIGS. 4 to 6.

The mirror controller 53 produces a control signal for controlling the direction of the scanning mirror 51, and outputs this to the mirror driver 52. The mirror controller 53 produces a drive waveform for the scanning mirror 51 according to the scanning region, the number of scan lines, and the frame rate that have been determined according to the midair image P0, for example, and outputs a synchronization signal indicating the scanning position of the scanning mirror 51.

The light receiver 3 receives natural light from the environment in which the input device 1 is installed, and reflected light R2 of the scanning laser beam R1 emitted from the irradiation component 10 toward the midair image P0. The "natural light" referred to herein includes not only light that originates naturally, such as sunlight or moonlight, but also any artificial light present in the environment other than the light emitted by the input device 1 (such as light from indoor lighting). The light receiver 3 subjects the incident light to photo-electric conversion into an electrical signal, and outputs the result. The electrical signal outputted by the light receiver 3 is sent to the coordinate detector 4.

The coordinate detector 4 receives a detection signal for the reflected light R2 of the scanning laser beam R1 from the light receiver 3, and receives a synchronization signal indicating the scanning position of the scanning mirror 51 from the mirror controller 53 of the irradiation component 10. The coordinate detector 4 calculates the coordinates on the midair image P0 indicated by the finger F of the user by associating the synchronization signal indicating the scanning position of the scanning mirror 51 with the reception timing of the reflected light R2. The coordinate signal calculated by the coordinate detector 4 is sent to the main controller 5.

The main controller 5 uses programs, control information, and the like stored in a memory (not shown) or the like to control the various constituent elements of the input device 1. The main controller 5 outputs control signals pertaining to the irradiation conditions of the scanning laser beam R1 to each of the LD controller 33, the optical controller 43, and the mirror controller 53 of the irradiation component 10. Then, the main controller 5 controls the irradiation parameter of the light by the irradiation component 10 according to the configuration of the input region.

The main controller 5 comprises the image processor 6. The image processor 6 produces an image that will serve as the basis for the midair image P0 including the input region displayed in air, according to the application that accepts input operations, or by changing the application or video on the basis of the coordinate signal received from the coordinate detector 4. The signal for the image that serves as the basis for the midair image P0 is sent to the image display component 2*a*.

The image processor 6 computes the scanning range of the scanning laser beam R1 emitted by the irradiation component 10, and decides the scanning angle of the scanning mirror 51, according to the size, shape, and so forth of the input region (i.e., the configurations of the input region). The image processor 6 also decides the irradiation timing of the infrared LD 31 and the frame rate and the number of the scan lines pertaining to the optical scanning by the scanner 50 according to the positions of the input keys, for example, that are provided in the input region as part of the image. The image processor 6 also decides the spot size for the infrared laser beam according to the size of the input keys, for example, provided to the input region.

In the illustrated embodiment, the main controller 5 includes a microcomputer or a processor. The main controller 5 can also include other conventional components such as an input interface circuit, an output interface circuit, and storage devices such as a ROM (Read Only Memory) device and a RAM (Random Access Memory) device. The microcomputer can be programmed to control the various component of the input device 1. The RAM stores statuses of operational flags and various control data. The ROM stores the programs for various operations. It will be apparent to those skilled in the art from this disclosure that the precise structure and algorithms can be any combination of hardware and software that will carry out the functions of the present invention. Also, each of the LD controller 33, the optical controller 43, and the mirror controller 53 of the irradiation component 10 can be configured in the same manner. In other words, each of the LD controller 33, the optical controller 43, and the mirror controller 53 can include a microcomputer or a processor.

Figure 3:
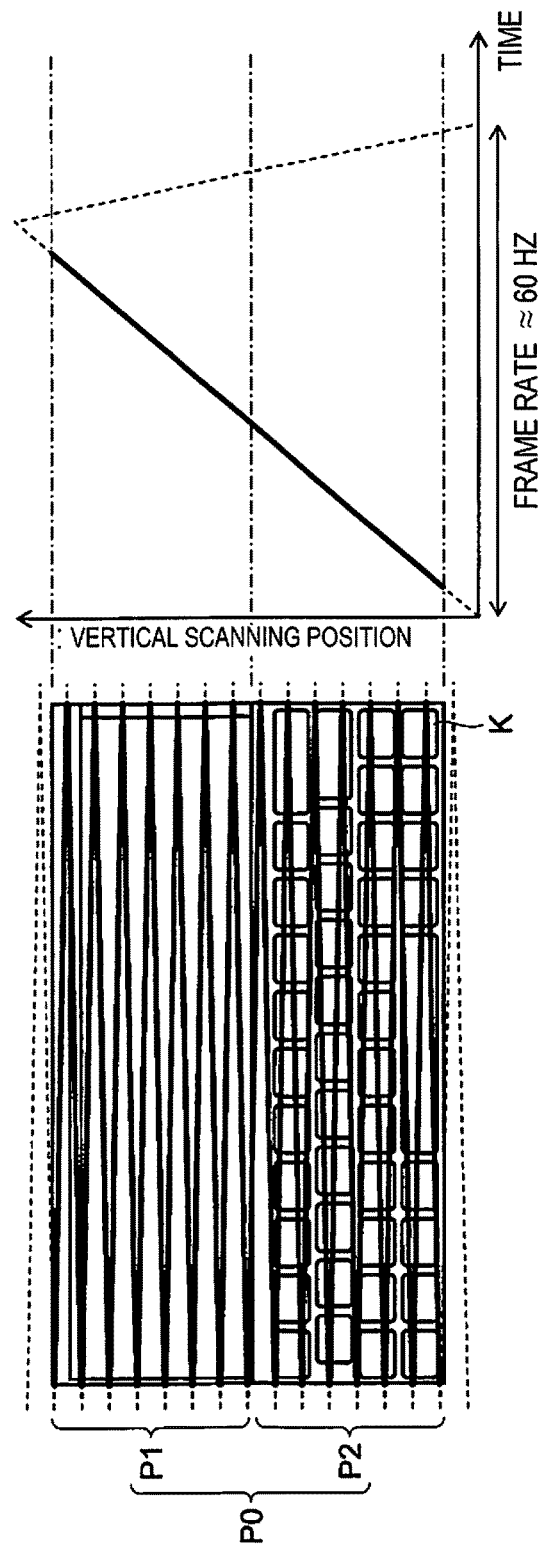
FIG. 3 is a diagram illustrating optical scanning conditions in a comparative example relative to optical scanning conditions with the input device in accordance with the first embodiment.

The optical scanning conditions in the input region of the input device 1 will now be described in detail through reference to FIGS. 3 and 4. FIG. 3 is a diagram illustrating the optical scanning conditions in a comparative example relative to the optical scanning conditions with the input device 1. FIG. 4 is a diagram illustrating the optical scanning conditions in the input region of the input device 1.

Figure 4:
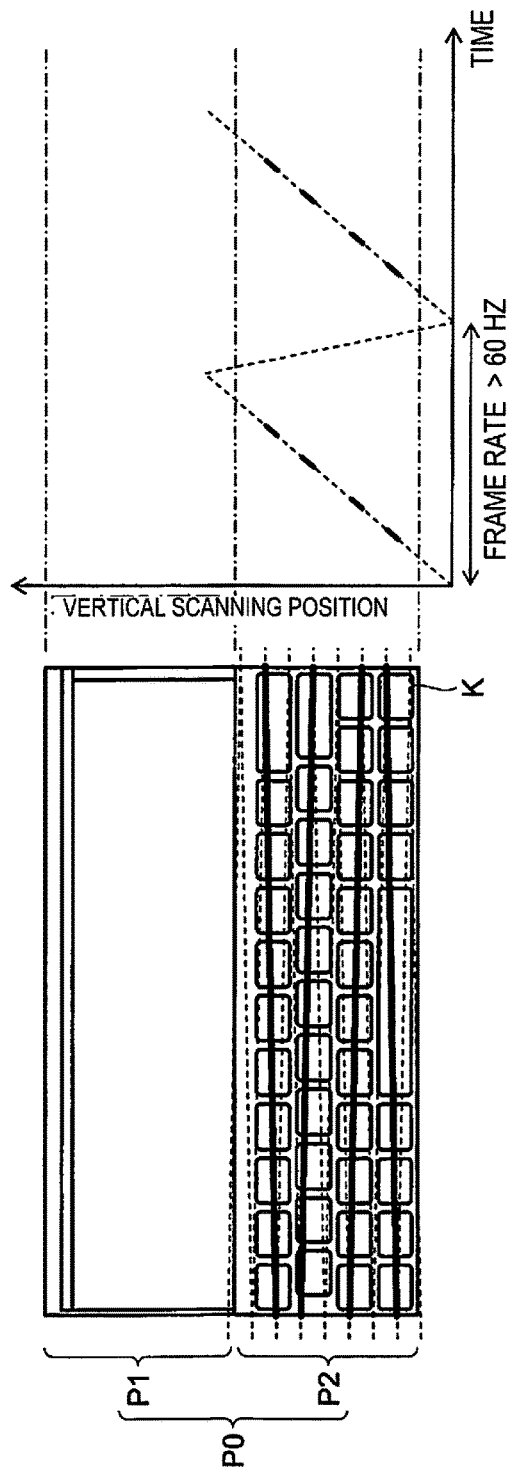
FIG. 4 is a diagram illustrating the optical scanning conditions with the input device in accordance with the first embodiment.

FIGS. 3 and 4 both show the midair image P0 on the left, and on the right show the drive waveform in the vertical direction of the scanning mirror 51 in optical scanning corresponding to the midair image P0. The path of the scanned infrared laser beam is drawn superposed over the midair image P0. In both the path of the infrared laser beam and the drive waveform in the vertical direction of the scanning mirror 51, solid lines indicate the period in which the infrared LD 31 is lit, and broken lines indicate the period in which the infrared LD 31 is not lit. The same applies to FIGS. 5 and 6 discussed below.

As shown in FIGS. 3 and 4, the midair image P0 comprises a video region P1 and an input region P2. The video region P1 forms a display screen for displaying an input from the input region P2, for example. The video region P1 is provided in approximately the upper half of the midair image P0, and the input region P2 is provided in approximately the lower half of the midair image P0, although the configuration of the midair image P0 is not limited to this. The input region P2 may be provided at any place in the midair image P0.

The input region P2 forms a kind of keyboard in which a plurality of input keys K (e.g., input images) are arranged in rows in the horizontal direction. In the illustrated embodiment, the input keys K are laid out in four vertically stacked rows. Specifically, the input keys K of the input region P2 are arranged in rows in the main scanning direction of the optical scanning performed by the scanner 50, and four rows are provided in the sub-scanning direction. The video region P1 does not display any input keys or the like that prompt an input operation by the user, and does not accept input operations.

The input device in a comparative example will now described in contrast to this embodiment. As shown in FIG. 3, the drive waveform in the vertical direction of the scanning mirror 51 usually has a sawtooth shape in order to improve response and resolution of detection with respect to the user's finger F or other such indicator. The frame rate in optical scanning is approximately 60 Hz. The optical scanning in this comparative example is executed over the entire midair image P0, including the video region P1. When even the video region P1, which does not accept input operations in the comparative example, is thus irradiated with the infrared laser beam, this can lead to higher power consumption and to a shorter service life for the infrared LD 31.

In contrast, with the input device 1 in this embodiment, the main controller 5 controls the irradiation parameter of the infrared laser beam emitted by the irradiation component 10 according to the configuration of the input region P2. This irradiation parameter is related to limiting the irradiation region, and as shown in FIG. 4, the irradiation region with the infrared laser beam is limited to the input region P2. Specifically, of the midair image P0, the input device 1 does not irradiate the video region P1 with the infrared laser beam, and only irradiates the input region P2 with the infrared laser beam.

Furthermore, the main controller 5 also controls the irradiation parameter related to the frame rate in the input region P2. As shown in FIG. 4, this irradiation parameter is set so that the infrared laser beam will pass through at a single scan line for all of the input keys K arranged horizontally in each row. Consequently, there are fewer scan lines, so the frame rate, which is usually 60 Hz, can be doubled or quadrupled. Furthermore, the infrared LD 31 is turned off between the rows of the input keys K arranged horizontally in rows.

As discussed above, the input device 1 in this embodiment comprises the projection component 2 for projecting the midair image P0 that includes the input region P2, the irradiation component 10 for irradiating the input region P2 with the infrared laser beam and performing optical scanning with the scanner 50, the light receiver 3 for receiving the reflected light R2 of the infrared laser beam that has been reflected by the user's finger F or the like that has moved into the input region P2, and the controller 5 for controlling the irradiation parameter of the infrared laser beam from the irradiation component 10 according to the configuration of the input region P2.

With this configuration, the input device 1 varies the irradiation parameter of the infrared laser beam used for detecting the user's finger F or other such indicator, according to the position, size, and so forth of the input region P2, for example. Consequently, the input device 1 can irradiate just the input region P2. Furthermore, the position of the input region P2 does not have to be fixed, and the position of the input region P2 can be varied according to the application in which the input device 1 is used. Specifically, in FIG. 4 the input region P2 is provided on the lower side of the midair image P0 as an example, but the input region P2 can be provided at any location in the midair image P0. Therefore, the input device 1 will consume less power, the service life of the infrared LD 31 (the light source) can be extended, and the device is easier to use.

Also, the input device 1 is such that the input region P2 has the plurality of input keys K arranged in the main scanning direction (horizontal direction) of the optical scanning, and the irradiation parameter pertaining to the frame rate in the input region P2 is set so that light will pass through at a single scan line for all of the input keys K arranged in the main scanning direction. Consequently, there are no scan lines between adjacent input keys K in the sub-scanning direction (vertical direction), that is, between rows. Therefore, there is less mis-detection when the finger F or other such indicator moves in between these input keys K. Also, since there are fewer scan lines, the frame rate in the input region P2 can be raised, and response can be improved. Furthermore, since the irradiation time is shorter, there is lower power consumption, and the service life of the infrared LD 31 is even longer.

In the illustrated embodiment, the input device 1 comprises the irradiation component 10 configured to emit scanning laser beam R1 (e.g., the scanning light) relative to the input region P2 of the midair image P0 (e.g., the projected image), the light receiver 3 configured to receive the reflected light R2 of the scanning laser beam R1 (e.g., the scanning light) to output the detection signal, the coordinate detector 4 (e.g., the detector) configured to detect an input operation of the finger F relative to the input region P2 of the midair image P0 (e.g., the projected image) based on the detection signal from the light receiver 3, and the main controller 5 (e.g., the controller) configured to set the irradiation parameter of the scanning laser beam R1 (e.g., the scanning light) from the irradiation component 10 based on the input region P2 of the midair image P0 (e.g., the projected image).

In the illustrated embodiment, the input device 1 further comprises the projection component 2 configured to project the midair image P0 (e.g., the projected image).

In the illustrated embodiment, the irradiation parameter includes at least one of the irradiation region of the irradiation component 10, the frame rate relative to the input region P2, the movement of the scanning laser beam R1 (e.g., the scanning light), and the spot size S of the scanning laser beam R1 (e.g., the scanning light).

In the illustrated embodiment, the input region P0 has the plurality of input keys K (e.g., the input images) for the input operation, and the main controller 5 (e.g., the controller) sets the irradiation parameter to emit the scanning laser beam R1 (e.g., the scanning light) on at least the input keys K (e.g., the input images) in the midair image P0 (e.g., the projected image).

In the illustrated embodiment, the input region P2 has the plurality of input keys K (e.g., the input images) for the input operation, and the main controller 5 (e.g., the controller) sets the irradiation parameter based on the key arrangement (e.g., the arrangement) of the input keys K (e.g., the input images).

In the illustrated embodiment, the input region P2 has the plurality of input keys K (e.g., the input images) for the input operation, with the input keys K (e.g., the input images) being arranged in the horizontal direction (e.g., the first direction) of the input region P2 with respect to each other, and the main controller 5 (e.g., the controller) sets the irradiation parameter to emit the scanning laser beam R1 (e.g., the scanning light) along a scan line that passes through the input keys K (e.g., the input images) that are arranged in the horizontal direction (e.g., the first direction) of the input region P2 with respect to each other.

In the illustrated embodiment, the input region P2 has the plurality of input keys K (e.g., the input images) for the input operation, with the input keys K (e.g., the input images) being arranged in the horizontal direction (e.g., the first direction) of the input region with respect to each other, and the main controller 5 (e.g., the controller) sets the irradiation parameter to continuously emit the scanning laser beam R1 (e.g., the scanning light) on the input keys K (e.g., the input images) while the scanning laser beam R1 (e.g., the scanning light) moving through the input keys K (e.g., the input images) in the horizontal direction (e.g., the first direction) of the input region P2.

In the illustrated embodiment, the input region P2 has the plurality of input keys K (e.g., the input images) for the input operation, with the input keys K (e.g., the input images) being arranged with respect to each other in rows, and the main controller 5 (e.g., the controller) sets the irradiation parameter not to emit the scanning laser beam R1 (e.g., the scanning light) between the rows (or the rows of the input keys).

In the illustrated embodiment, the midair image P0 (e.g., the projected image) further has the video region P1 that is different from the input region P2, and the main controller 5 (e.g., the controller) sets the irradiation parameter to emit the scanning laser beam R1 (e.g., the scanning light) only on the input region P2.

In the illustrated embodiment, the irradiation component 10 includes the light emitting component 30 that emits the scanning laser beam R1 (e.g., the scanning light), and the scanner 50 that moves the scanning laser beam R1 (e.g., the scanning light).

In the illustrated embodiment, the irradiation component 10 further includes the optical component 40 that adjust the spot size of the scanning laser beam R1 (e.g., the scanning light).

In the illustrated embodiment, the scanner 50 includes the scanning mirror 51 that reflects the scanning laser beam R1 (e.g., the scanning light) towards the input region P2 of the midair image P0 (e.g., the projected image).

In the illustrated embodiment, the light emitting component 30 includes the infrared laser diode 31.

Second Embodiment

Figure 5:
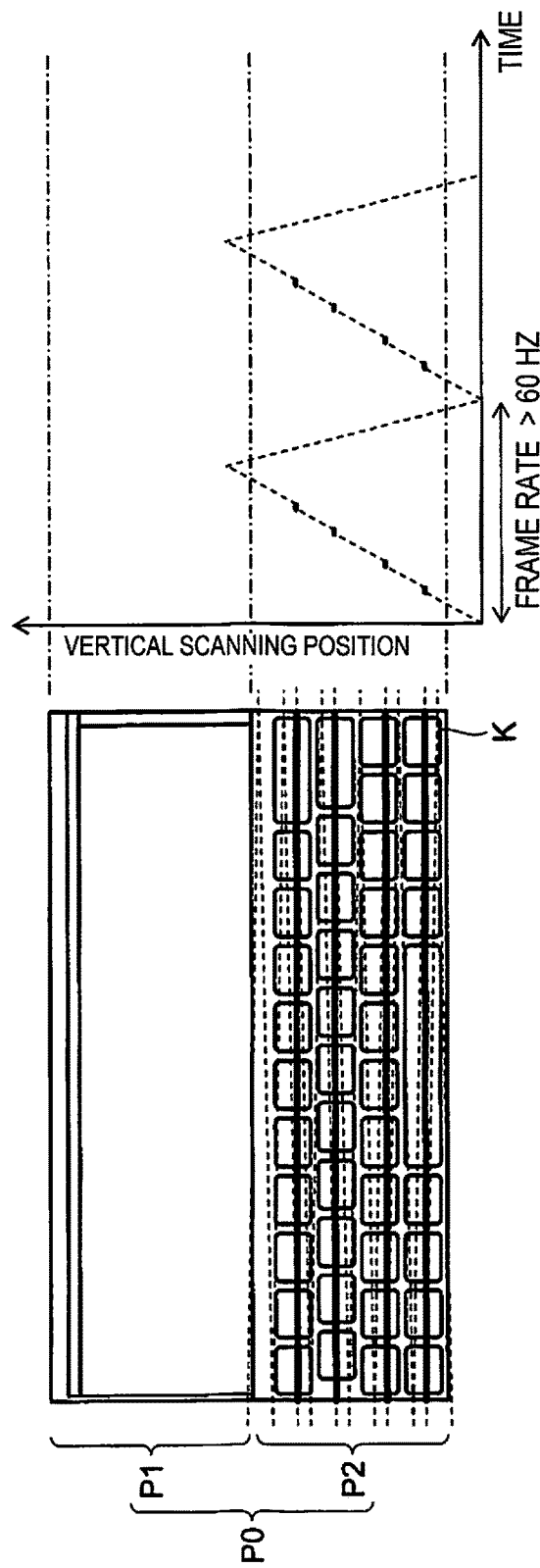
FIG. 5 is a diagram illustrating optical scanning conditions with an input device in accordance with a second embodiment.

Referring now to FIG. 5, an input device 1 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Basically, the input device 1 in accordance with the second embodiment is identical to the input device 1 in accordance with the first embodiment except for the configurations explained below. FIG. 5 is a diagram illustrating the optical scanning conditions in the input region of the input device 1.

With the input device 1 in the second embodiment, the irradiation parameter, which is controlled by the main controller 5 according to the configuration of the input region P2, pertains to movement in the sub-scanning direction (vertical direction) in optical scanning. This irradiation parameter is set so that movement in the sub-scanning direction (vertical direction) in optical scanning will stop temporarily while scanning on each row of the input keys K, as shown in FIG. 5.

With this configuration, the accuracy at which a single scan line passes through a plurality of the input keys K arranged in the main scanning direction (horizontal direction) of optical scanning can be increased. Furthermore, the scan line can pass through the center of the input keys K in relation to the sub-scanning direction (vertical direction), which further reduces mis-detection of the finger F or other such indicator.

The infrared laser beam may be emitted so as to overwrite a plurality of scan lines at the stop position, which is where the movement stops in the sub-scanning direction of optical scanning. This allows the continuity of the irradiation state to be obtained, and makes it less likely that mis-detection will occur due to unintended strength in natural light or the like. Therefore, the finger F or other such indicator can be detected more accurately.

Also, the infrared laser beam may be emitted so that the scan line undulates within the region of individual input keys K in relation to the sub-scanning direction (vertical direction) with respect to the stop position of movement in the sub-scanning direction. This makes it more likely that the infrared laser beam will hit the finger F or other such indicator, and allows detection accuracy to be improved.

In the illustrated embodiment, the input region P2 has the plurality of input keys K (e.g., the input images) for the input operation, with the input keys K (e.g., the input images) being arranged in the horizontal direction (e.g. the first direction) of the input region P2 with respect to each other, and the main controller 5 (e.g., the controller) sets the irradiation parameter to emit the scanning laser beam R1 (e.g., the scanning light) along a scan line that passes through the input keys K (e.g., the input images) that are arranged in the horizontal direction (e.g., the first direction) of the input region P2 with respect to each other.

In the illustrated embodiment, the scan line extends parallel to the horizontal direction (e.g., the first direction) of the input region P2.

In the illustrated embodiment, the input region P2 has the plurality of input keys K (e.g., the input images) for the input operation, with the input keys K (e.g., the input images) being arranged with respect to each other in rows that extend in the horizontal direction (e.g., the first direction) of the input region P2 and are arranged with respect to each other in the vertical direction (e.g., the second direction) of the input region P2 that intersects with the horizontal direction (e.g., the first direction), and the main controller 5 (e.g., the controller) sets the irradiation parameter to prevent the scanning laser beam R1 (e.g., the scanning light) from moving in the vertical direction (e.g., the second direction) of the input region P2 while emitting the scanning laser beam R1 (e.g., the scanning light) along the horizontal direction (e.g., the first direction) of the input region P2.

Third Embodiment

Figure 6:
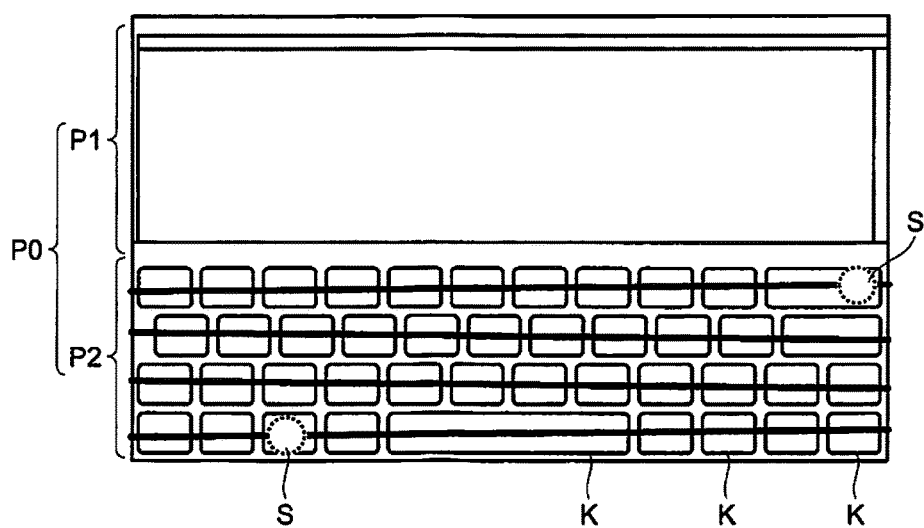
FIG. 6 is a diagram illustrating optical scanning conditions with an input device in accordance with a third embodiment.

Referring now to FIG. 6, an input device 1 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. Basically, the input device 1 in accordance with the third embodiment is identical to the input device 1 in accordance with the first embodiment except for the configurations explained below. FIG. 6 is a diagram illustrating the optical scanning conditions in the input region of the input device 1.

With the input device 1 in the third embodiment, the irradiation parameter, which is controlled by the main controller 5 according to the configuration of the input region P2, pertains to the spot size of the infrared laser beam emitted by the irradiation component 10. This irradiation parameter is set so that the size of the spot S of the infrared laser beam corresponds to the size of the input keys K, as shown in FIG. 6. This is accomplished by moving the collimator lens of the optical system 41 in the optical axis direction to change the distance from the infrared LD 31, so that the size of the spot S of the infrared laser beam in the input region P2 will be substantially the same as the size of the input keys K in the vertical direction.

With this configuration, when the user points at an input key K or some other portion, the infrared laser beam emitted by the irradiation component 10 will hit the finger F or other such indicator. Therefore, the reliability of the input operation can be improved.

In the illustrated embodiment, the input region P2 has the plurality of input keys K (e.g., the input images) for the input operation, and the main controller 5 (e.g., the controller) sets the irradiation parameter based on the size of the input keys K (e.g., the input images).

In the illustrated embodiment, the input region P2 has the plurality of input keys K (e.g., the input images) for the input operation, and the main controller 5 (e.g., the controller) sets the spot size S of the scanning laser beam R1 (e.g., the scanning light) as the irradiation parameter to correspond to the size of the input keys K (e.g., the input images).

Fourth Embodiment

Figure 7:
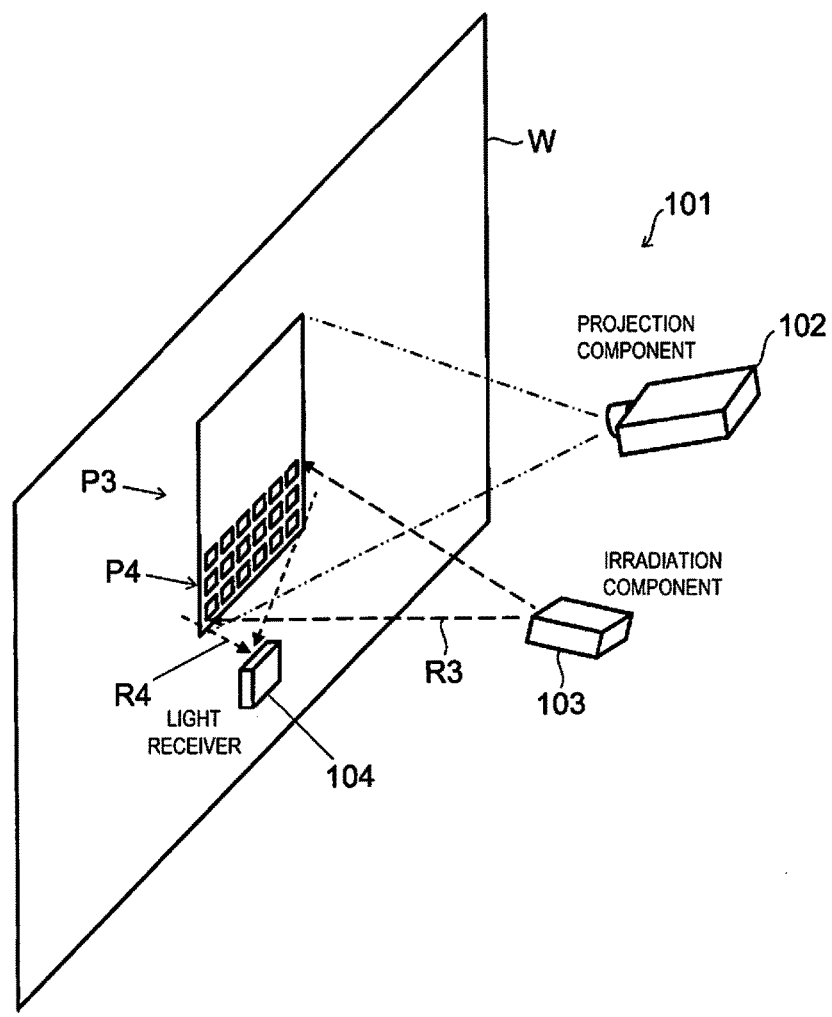
FIG. 7 is a simplified diagram of the configuration of an input device in accordance with a fourth embodiment.

Referring now to FIG. 7, an input device 101 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. FIG. 7 is a simplified diagram of the configuration of the input device 101.

As shown in FIG. 7, the input device 101 in the fourth embodiment projects a wall image P3 that includes an input region P4 onto a specific region of a wall W. The input device 101 is basically identical to the input device 1 in the first embodiment, except that the input device 101 comprises a projection component 102, an irradiation component 103, and a light receiver 104. Thus, the coordinate detector 4 and the main controller 5 are not depicted in the drawings or described here.

The projection component 102 is configured as a projector, for example, and produces the wall image P3 by projecting it onto a specific region of the wall W. The irradiation component 103 emits a scanning laser beam R3 composed of an infrared laser beam toward the wall image P3. The input device 101 irradiates only the input region P4 out of the wall image P3 with the scanning laser beam R3. The light receiver 104 receives natural light from the environment in which the input device 101 is installed, and reflected light R4 of the scanning laser beam R3 emitted from the irradiation component 103 toward the wall image P3.

Thus, again with the input device 101 that accepts input operations by projecting the wall image P3 that includes the input region P4 onto the wall W, just the input region P4 can be irradiated with the infrared laser beam. This reduces the power consumption of the input device 101, extends the service life of the light source, and makes the device easier to use.

The present invention can also be applied to input devices that accept input operations by projecting an image that includes an input region onto a floor or a display panel screen, instead of in the air or onto a wall.

Embodiments of the present invention are described above, but the scope of the present invention is not limited to or by these, and various modifications are possible without departing from the gist of the invention.

For example, in the above-mentioned embodiments, the midair image P0 includes the video region P1 on the upper half of the midair image P0 and the input region P2 on the lower half of the midair image P0 as illustrated in FIGS. 4 to 6, and the input region P2 forms an image of a computer keyboard having the input keys K. In other words, in the illustrated embodiment, the midair image P0 includes an image showing a computer screen and a computer keyboard. However, the present invention is not limited to this. The midair image P0 can include different types of images showing an electronic calculator, a mobile phone, and the like, which has an input function. Also, the midair image P0 can solely include the input region P2 without the video region P1 (see FIGS. 8 to 10). In this case, the input region P2 can include different key arrangements from the key arrangement of the computer keyboard.

Figure 8:
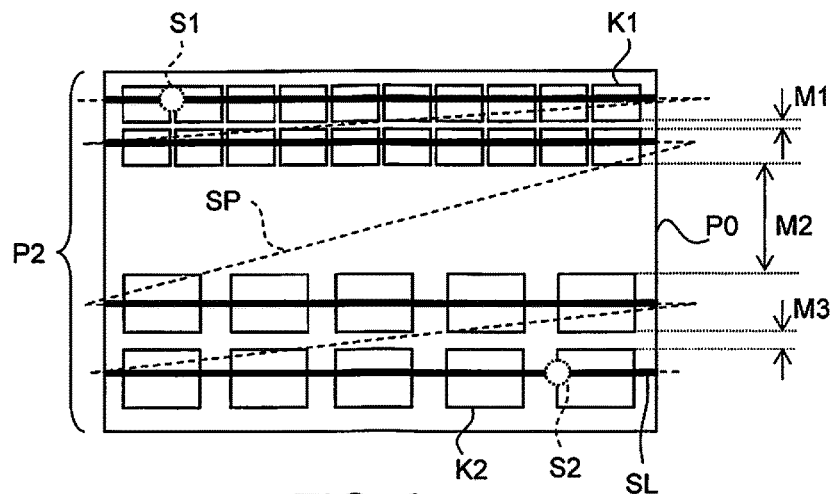
FIG. 8 is a diagram illustrating optical scanning relative to a projected image in accordance with a modified example.

For example, as illustrated in FIG. 8, the input region P2 can be located over the entire midair image P0. As illustrated in FIG. 8, for example, the input region P2 has a plurality of (two in FIG. 8) rows of small keys K1, and a plurality of (two in FIG. 8) rows of large keys K2 that are larger in size than the small keys K1. A plurality of (ten in FIG. 8) the small keys K1 are arranged horizontally in each of the rows, while a plurality of (five in FIG. 8) the large keys K2 are arranged horizontally in each of the rows. In the illustrated embodiment, the small keys K1 in a row are aligned with each other as viewed horizontally, while the large keys K2 in a row are aligned with each other as viewed horizontally. Also, the vertical key pitches M1, M2 and M3 between the rows are different from each other. With this input region P2, the main controller 5 determines the unicursal scanning path SP (dotted lines SP in FIG. 8) based on the key arrangement of the input region P2 such that the scanning path SP passes through each of the rows of the small keys K1 and the large keys K2. Then, the main controller 5 sets the irradiation parameters about the frame rate of the optical scanning, the vertical offset amount (in the sub-scanning direction) of the adjacent pairs of scan lines that scans on the rows of the small keys K1 and the large keys K2, the irradiation timing of the light emitting component 30, the spot size S1 (or S2) of the infrared laser beam, and the like. Then, the LD controller 33, the optical controller 43, and the mirror controller 53 of the irradiation component 10 are configured according to the irradiation parameters from the main controller 5. With this arrangement, the optical component 40 are set such that the infrared laser beam has the spot size S1 (or S2). Also, the scanner 50 performs the optical scanning along the scanning path SP according to the irradiation parameter from the main controller 5 such that the scanning path SP passes through each of the small keys K1 and the large keys K2. Furthermore, the light emitting component 30 emits the infrared laser beam while the scanner 50 performs the optical scanning along the rows of the small keys K1 and the large keys K2 (solid lines SL in FIG. 8). Thus, even though the vertical key pitches M1 to M3 are different from each other, the infrared laser beam is emitted only along the rows of the small keys K1 and the large keys K2 with a proper spot size S1 (or S2) for the small keys K1 and the large keys K2. In the illustrated embodiment, the spot size S1 and S2 are equal to each other through the scanning path SP. However, of course, the spot sizes S1 and S2 can be different at location along the scanning path SP according to the key arrangement of the input region P2. For example, the spot size S1 of the infrared laser beam scanned on the small keys K1 can be smaller in diameter than the spot size S2 of the infrared laser beam scanned on the large keys K2. Furthermore, the wall image P3 illustrated in FIG. 7 can also include the input region P2 as shown in FIG. 8.

In this modified example, the input region P2 has the plurality of small keys K1 or large keys K2 (e.g., the input keys or the input images) for the input operation, with the small keys K1 or the large keys K2 (e.g., the input keys or the input images) being arranged in the horizontal direction (e.g., the first direction) of the input region P2 with respect to each other, and the main controller 5 (e.g., the controller) sets the irradiation parameter to continuously emit the scanning laser beam R1 (e.g., the scanning light) on the small keys K1 or the large keys K2 (e.g. the input keys or the input images) while the scanning laser beam R1 (e.g., the scanning light) moving through the small keys K1 or the large keys K2 (e.g., the input keys or the input images) in the horizontal direction (e.g., the first direction) of the input region P2.

In this modified example, the input region P2 has the plurality of small keys K1 or large keys K2 (e.g., the input keys or the input images) for the input operation, with the small keys K1 and the large keys K2 (e.g., the input keys or the input images) being arranged with respect to each other in rows with different pitches therebetween.

Figure 9:
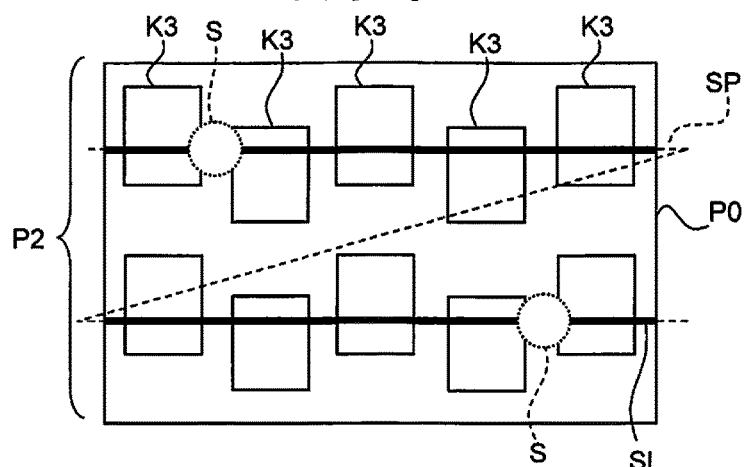
FIG. 9 is a diagram illustrating optical scanning relative to a projected image in accordance with a modified example.

Furthermore, as illustrated in FIG. 9, the input region P2 can include a plurality (two in FIG. 9) sets of a plurality (five in FIG. 9) of input keys K3. The input keys K3 of each set are arranged horizontally, but are not aligned vertically with each other or are vertically offset with each other. With this input region P2, the main controller 5 determines the unicursal scanning path SP (dotted lines SP in FIG. 9) based on the key arrangement of the input region P2 such that the scanning path SP passes through each of the input keys K3. Then, the main controller 5 sets the irradiation parameters about the frame rate of the optical scanning, the vertical offset amount (in the sub-scanning direction) of the adjacent pair of scan lines that scans on the input keys K3 for each set, the irradiation timing of the light emitting component 30, the spot size S of the infrared laser beam, and the like. Then, the LD controller 33, the optical controller 43, and the mirror controller 53 of the irradiation component 10 are configured according to the irradiation parameters from the main controller 5. With this arrangement, the optical component 40 are set such that the infrared laser beam has the spot size S with which the offset input keys K3 can be scanned with a single scan line SL. Also, the scanner 50 performs the optical scanning along the scanning path SP according to the irradiation parameter from the main controller 5 such that the scanning path SP passes through the input keys K3 for each set. Furthermore, the light emitting component 30 emits the infrared laser beam while the scanner 50 performs the optical scanning along the input keys K3 for each set (solid lines SL in FIG. 9). Thus, even though the input keys K3 for each set are vertically offset with respect to each other, the infrared laser beam is incident on each of the input keys K3 with a proper spot size S while scanning the infrared laser beam along a straight line (solid lines SL in FIG. 9). In the illustrated embodiment, the spot size S can be set enough for emitting the infrared laser beam on the input keys K3 that are vertically offset with respect to each other. Furthermore, the wall image P3 illustrated in FIG. 7 can also include the input region P2 as shown in FIG. 9.

In this modified example, the input region P2 has the plurality of input keys K3 (e.g., the input images) for the input operation, with the input keys K3 (e.g., the input images) being arranged in the horizontal direction (e.g., the first direction) of the input region P2 with respect to each other, and the main controller 5 (e.g., the controller) sets the irradiation parameter to continuously emit the scanning laser beam R1 (e.g., the scanning light) on the input keys K3 (e.g., the input images) while the scanning laser beam R1 (e.g., the scanning light) moving through the input keys K3 (e.g., the input images) in the horizontal direction (e.g., the first direction) of the input region P2.

In this modified embodiment, the input region P2 has the plurality of input keys K3 (e.g., the input images) for the input operation, with the input keys K3 (e.g., the input images) being arranged in the horizontal direction (e.g., the first direction) of the input region P2 with respect to each other, with the input keys K3 (e.g., the input images) being at least partially offset with respect to each other in the vertical direction (e.g., the second direction) of the input region P2 that intersects with the horizontal direction (e.g., the first direction).

Figure 10:
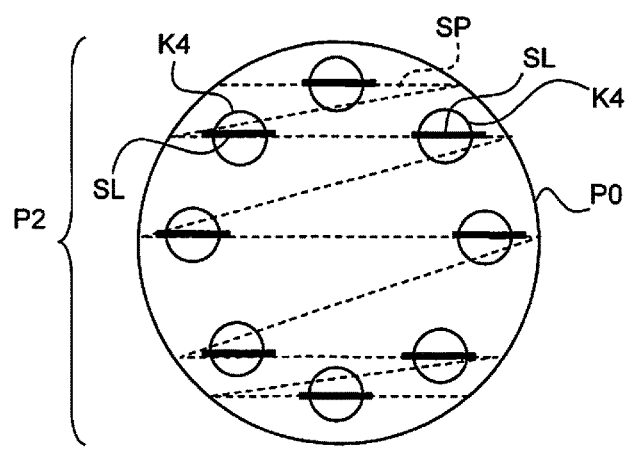
FIG. 10 is a diagram illustrating optical scanning relative to a projected image in accordance with a modified example.

Moreover, in the above-mentioned embodiments, the midair image P0 or the wall image P3 has a rectangular shape, as illustrated in FIGS. 4 to 7. However, the midair image or the wall image can have a different shape. For example, as illustrated in FIG. 10, the midair image P0 can have a circular shape. Specifically, the midair image P0 has the input region P2 with a plurality of input keys K4 that are circumferentially arranged in the peripheral portions of the midair image P0. With this input region P2, the main controller 5 determines the unicursal scanning path SP (dotted lines SP in FIG. 10) based on the key arrangement of the input region P2 such that the scanning path SP passes through each of the input keys K4. Then, the main controller 5 sets the irradiation parameters about the frame rate of the optical scanning, the vertical offset amount (in the sub-scanning direction) of the adjacent pair of scan lines that scans on the input keys K4, the irradiation timing of the light emitting component 30, the spot size S of the infrared laser beam, and the like. Then, the LD controller 33, the optical controller 43, and the mirror controller 53 of the irradiation component 10 are configured according to the irradiation parameters from the main controller 5. With this arrangement, the optical component 40 are set such that the infrared laser beam has the spot size S. Also, the scanner 50 performs the optical scanning along the scanning path SP according to the irradiation parameter from the main controller 5 such that the scanning path SP passes through the input keys K4. Furthermore, the light emitting component 30 emits the infrared laser beam while the scanner 50 performs the optical scanning on the input keys K4 (solid line segments SL in FIG. 10). In particular, in the above-mentioned embodiment, the light emitting component 30 continuously emits the infrared laser beam while the scanner 50 performs the optical scanning in the horizontal direction. In particular, as illustrated in FIGS. 8 and 9, the light emitting component 30 continuously emits the infrared laser beam (solid lines SL in FIGS. 8 and 9) from one horizontal end (e.g., left end) of the midair image P0 to the other horizontal end (e.g., right end) of the midair image P0. On the other hand, with the input device as illustrated in FIG. 10, the light emitting component 30 intermittently emits the infrared beam (sold line segments SL in FIG. 10) according to the positions of the input keys K4 while scanning horizontally. In other words, the light emitting component 30 turns off the infrared beam at the position horizontally between the input keys K4.

In this modified embodiment, the input region P2 has the plurality of input keys K4 (e.g., the input images) for the input operation, with the input keys K4 (e.g., the input images) being spaced apart in the horizontal direction (e.g., the first direction) of the input region P2 with respect to each other, and the main controller 5 (e.g., the controller) sets the irradiation parameter to intermittently emit the scanning laser beam R1 (e.g., the scanning light) according to positions of the input keys K4 (e.g., the input images) while the scanning laser beam R1 (e.g., the scanning light) moving through the input keys K4 (e.g., the input images) in the horizontal direction (e.g., the first direction) of the input region P2.

As illustrated in the above-mentioned embodiments, the present invention can be utilized in input devices.

Specifically, the input device comprises a projection component for projecting an image that includes an input region, an irradiation component for irradiating the input region with light and performing optical scanning, a light receiver for receiving the light of the irradiation component that has been reflected by an indicator that has moved into the input region, and a controller for controlling the irradiation parameter of light from the irradiation component according to the configuration of the input region.

With this configuration, the input device can change the irradiation parameter of light used for detecting the user's finger or another such indicator so as to match the position, size, and so forth of the input region, for example. Consequently, the input device allows just the input region to be irradiated. Furthermore, the position of the input region is not fixed, and it is possible, for example, to vary the position of the input region according to the application in which the input device is used. Therefore, the input device consumes less power, the service life of the light sources is longer, and the device is easier to use.

Also, with the input device configured as above, the irradiation parameter includes at least one of the limitation of the irradiation region, the frame rate with respect to the input region, movement in a sub-scanning direction in the optical scanning, and the spot size of the light emitted from the irradiation component.

With this configuration, the input device limits the irradiation region to just the input region, reduces the number of scan lines according to the layout of the input keys that serve as part of the image of the input region, and increases the accuracy at which the light emitted by the irradiation component hits the indicator.

Also, with the input device configured as above, the input region has a plurality of input keys arranged in the sub-scanning direction of the optical scanning, as at least part of the image, and the irradiation parameter related to the frame rate with respect to the input region is set so that light will pass through at a single scan line for all of the input keys arranged in the main scanning direction.

With this configuration, there are no scan lines between adjacent input keys in the sub-scanning direction. Therefore, there is less mis-detection when a finger or other such indicator moves in between these input keys. Also, since there are fewer scan lines, the frame rate in the input region can be higher, which improves response. Furthermore, since the irradiation time is shorter, less power is consumed and the service life of the light sources is even longer.

Also, with the input device configured as above, the input region is configured so that a plurality of input keys arranged in rows in the main scanning direction of the optical scanning are laid out in a plurality of rows in the sub-scanning direction, as at least part of the image, and the irradiation parameter related to movement in the sub-scanning direction in the optical scanning is set so that movement in the sub-scanning direction in optical scanning will be temporarily halted while scanning on each row of input keys.

With this configuration, the accuracy at which a single scan line passes through a plurality of input keys arranged in the main scanning direction of optical scanning is increased. Furthermore, the scan line can pass through the center of the input keys in relation to the sub-scanning direction, which further reduces mis-detection of a finger or other such indicator.

Also, with the input device configured as above, the input region has a plurality of input keys as at least part of the image, and the irradiation parameter related to the spot size of light emitted from the irradiation component is set so that the spot size of the light will corresponding to the size of the input keys.

With this configuration, no matter which portion of an input key the user indicates, the light emitted by the irradiation component will hit the indicator. Therefore, the reliability of the input operation is enhanced.

With the configuration of the present invention, an input device is provided with which power consumption is reduced, the service life of the light sources is increased, and the device is easier to use.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An input device comprising:
   a projector that projects projection light that forms an image with an input region on a predetermined area;
   an irradiator that emits scanning light relative to the predetermined area, the scanning light being different from the projection light;
   a light receiver that receives reflected light of the scanning light to output detection signal;
   a detector that detects an input operation relative to the input region based on the detection signal from the light receiver; and
   a controller that controls the irradiator to emit the scanning light at different emission patterns according to an arrangement of the input region within the image, the controller further controlling the irradiator to irradiate the input region in a predetermined direction, with the predetermined direction including a first direction and a second direction that is opposite in a scanning direction, and to turn off the scanning light at a scan line along either the first direction or the second direction in the input region.

2. The input device according to claim 1, wherein the controller sets an irradiation parameter of the scanning light, the irradiation parameter including at least one of an irradiation region of the irradiator, a frame rate relative to the input region, velocity of the scanning light, and spot size of the scanning light.

3. The input device according to claim 1, wherein the input region has input images for the input operation, and
the controller sets an irradiation parameter of the scanning light to emit the scanning light on at least the input images.

4. The input device according to claim 1, wherein the input region has input images for the input operation, and
the controller sets an irradiation parameter of the scanning light based on an arrangement of the input images.

5. The input device according to claim 1, wherein the input region has input images for the input operation, with the input images being arranged in the first direction of the input region, and
the controller sets an irradiation parameter of the scanning light to emit the scanning light along the scan line that passes through a center of the input images that are arranged in the first direction of the input region.

6. The input device according to claim 5, wherein the scan line extends parallel to the first direction of the input region.

7. The input device according to claim 1, wherein the input region has input images for the input operation, with the input images being arranged in rows that extend in the first direction of the input region and are arranged in the second direction of the input region that intersects with the first direction, and
the controller sets an irradiation parameter of the scanning light to prevent the scanning light from moving in the second direction of the input region while emitting the scanning light along the first direction of the input region.

8. The input device according to claim 1, wherein the input region has input images for the input operation, and
the controller sets an irradiation parameter of the scanning light based on size of the input images.

9. The input device according to claim 1, wherein the input region has input images for the input operation, and
the controller sets spot size of the scanning light as an irradiation parameter of the scanning light to correspond to size of the input images.

10. The input device according to claim 1, wherein the input region has input images for the input operation, with the input images being arranged in the first direction of the input region, and
the controller sets an irradiation parameter of the scanning light to continuously emit the scanning light on the input images while the scanning light moving through the input images in the first direction of the input region.

11. The input device according to claim 1, wherein the input region has input images for the input operation, with the input images being spaced apart in the first direction of the input region, and
the controller sets an irradiation parameter of the scanning light to intermittently emit the scanning light according to positions of the input images while the scanning light moving through the input images in the first direction of the input region.

12. The input device according to claim 1, wherein the input region has input images for the input operation, with the input images being arranged in rows with different pitches therebetween.

13. The input device according to claim 1, wherein the input region has input images for the input operation, with the input images being arranged in the first direction of the input region, with the input images being at least partially offset with respect to each other in the second direction of the input region that intersects with the first direction.

14. The input device according to claim 1, wherein the input region has input images for the input operation, with the input images being arranged in rows, and the controller sets an irradiation parameter of the scanning light not to emit the scanning light between the rows.

15. The input device according to claim 1, wherein the image further has a video region that is different from the input region, and the controller sets an irradiation parameter of the scanning light to emit the scanning light only on the input region.

16. The input device according to claim 15, wherein the image is based on an application that accepts the input operation.

17. The input device according to claim 1, wherein the irradiator includes a light emitter that emits the scanning light, and a scanner that moves the scanning light.

18. The input device according to claim 17, wherein the irradiator further includes an optical component that adjust spot size of the scanning light.

19. The input device according to claim 17, wherein the scanner includes a scanning mirror that reflects the scanning light towards the input region.

* * * * *